United States Patent
Angel et al.

(10) Patent No.: US 12,261,942 B2
(45) Date of Patent: Mar. 25, 2025

(54) SECURITY OF SURVEILLANCE MEDIA

(71) Applicant: NAGRAVISION S.A., Cheseaux-sur-Lausanne (CH)

(72) Inventors: Michel Angel, Cheseaux-sur-Lausanne (CH); Hervé Retaureau, Cheseaux-sur-Lausanne (CH); Antony Celletti, Cheseaux-sur-Lausanne (CH)

(73) Assignee: NAGRAVISION S.A., Cheseaux-sur-Lausanne (CH)

( * ) Notice: Subject to any disclaimer, the term of this patent is extended or adjusted under 35 U.S.C. 154(b) by 43 days.

(21) Appl. No.: 18/334,198

(22) Filed: Jun. 13, 2023

(65) Prior Publication Data

US 2023/0401292 A1 Dec. 14, 2023

Related U.S. Application Data

(63) Continuation of application No. 16/492,625, filed as application No. PCT/EP2018/058628 on Apr. 4, 2018, now Pat. No. 11,714,883.

(30) Foreign Application Priority Data

Apr. 4, 2017 (EP) ..................................... 17164869

(51) Int. Cl.
*H04L 29/06* (2006.01)
*H04L 9/08* (2006.01)
(Continued)

(52) U.S. Cl.
CPC ........ *H04L 9/0822* (2013.01); *H04L 63/0428* (2013.01); *H04L 63/068* (2013.01);
(Continued)

(58) Field of Classification Search
CPC . H04L 63/10; H04L 2209/60; H04L 63/0428; G06F 21/107
See application file for complete search history.

(56) References Cited

U.S. PATENT DOCUMENTS

| | | | |
|---|---|---|---|
| 7,508,941 B1 * | 3/2009 | O'Toole, Jr. .......... | H04L 9/3263 380/232 |
| 8,826,036 B1 * | 9/2014 | Snodgrass ........... | G06F 21/1011 713/168 |

(Continued)

*Primary Examiner* — Dao Q Ho
(74) *Attorney, Agent, or Firm* — POLSINELLI LLP

(57) ABSTRACT

A media device receives a domain key from a service provider. The media device further encrypts media with a media key and encrypts the media key with the domain key to form an encrypted media token: the protected media key is encapsulated in an encrypted media token. The service provider may then receive the encrypted media token and one or more receiving entity identifiers relating to a receiving entity and ascertain whether the receiving entity is entitled to access media from the media device. If the receiving entity is entitled to access media from the media device, the service provider decrypts the cryptographic media token using the domain key to obtain the media key and providing the media key to the receiving entity. As such, an authenticated receiving entity may obtain the media key necessary to decrypt the media. Moreover, there is no requirement for any intermediate entity to have similar access and thus the encryption provided by the media key is in place throughout the transport of the media from media device to receiving entity.

9 Claims, 4 Drawing Sheets

(51) Int. Cl.
*H04L 9/40* (2022.01)
*H04N 7/18* (2006.01)
*H04N 21/2347* (2011.01)
*H04N 21/266* (2011.01)
*G06F 21/10* (2013.01)

(52) U.S. Cl.
CPC .............. *H04L 63/08* (2013.01); *H04L 63/10* (2013.01); *H04N 7/183* (2013.01); *H04N 21/2347* (2013.01); *H04N 21/26613* (2013.01); *G06F 21/107* (2023.08); *H04L 2209/60* (2013.01)

(56) References Cited

U.S. PATENT DOCUMENTS

| | | | |
|---|---|---|---|
| 2006/0005257 A1* | 1/2006 | Tohru | G11B 20/00862 |
| 2007/0112676 A1* | 5/2007 | Kontio | G06Q 20/3674 |
| | | | 705/50 |
| 2008/0256592 A1* | 10/2008 | Schnell | G06F 21/1012 |
| | | | 726/1 |
| 2011/0016319 A1* | 1/2011 | Lundberg | H04L 9/0819 |
| | | | 713/170 |
| 2014/0208393 A1* | 7/2014 | Yasukawa | H04L 61/2567 |
| | | | 726/4 |
| 2015/0235011 A1* | 8/2015 | Swaminathan | H04L 67/02 |
| | | | 713/150 |
| 2016/0088048 A1* | 3/2016 | Park | H04N 21/4627 |
| | | | 705/57 |
| 2016/0239836 A1* | 8/2016 | von Mueller | H04L 63/0428 |
| 2017/0026440 A1* | 1/2017 | Cockrell | H04L 67/01 |

* cited by examiner

SECURITY OF SURVEILLANCE MEDIA

RELATED APPLICATION

This application is a continuation of U.S. Non-Provisional patent application Ser. No. 16/492,625, filed Sep. 10, 2019 which is a 371 of International Application Serial No. PCT/EP2018/058628, filed Apr. 4, 2018, which claims priority to European Application Serial No. 17164869.4, filed Apr. 4, 2017 of which are hereby incorporated by reference in their entirety and for all purposes.

FIELD

The present disclosure relates to the security of media generated by media device, such as a surveillance device. In particular, but not exclusively, it relates to ensuring confidentiality of media generated by a surveillance camera.

BACKGROUND

Many video surveillance systems protect generated surveillance media content during transport between elements of the system. For example, where a camera generates a media stream for view at a remote device, confidentiality of the media is enforced in transport of the media stream between elements of the system, such as between the camera, remote device and any intermediate devices though which the media stream is transported.

As a consequence, outside of secure communication phases between system elements, there is often not protection enforcement and the media content is actually unprotected, vulnerable and can be disclosed. Access control with suitable policy management is not always or weakly implemented on one or more elements of the system, meaning that: unprotected media content can be accessed without authorisation in elements without effective access control or monitoring; media content is unprotected and vulnerable when access control or monitoring at any element is hacked or otherwise bypassed.

DETAILED DESCRIPTION OF THE DRAWINGS

Figure 1:
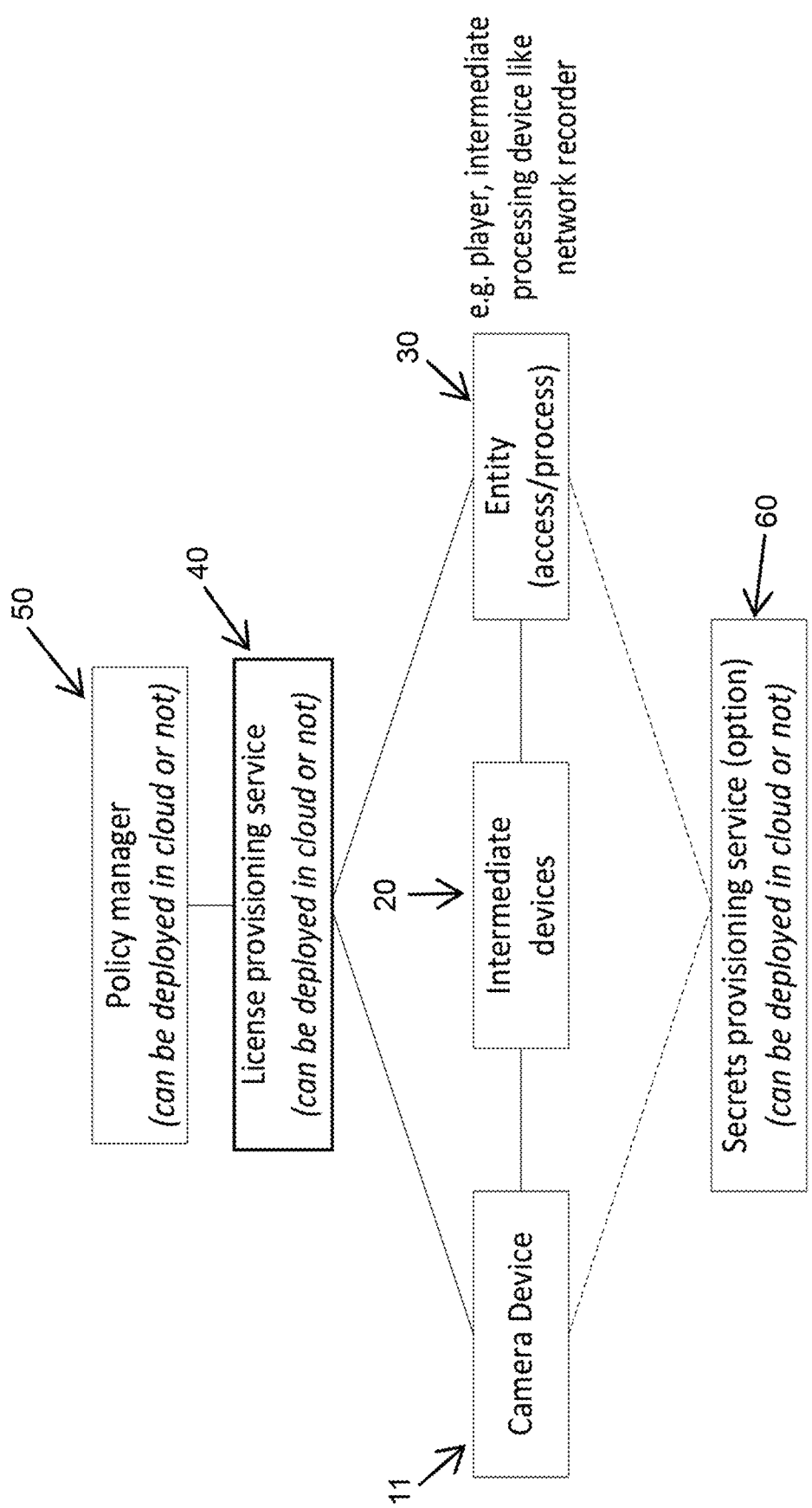
FIG. 1 is a schematic illustration of a system for implementing a preferred embodiment.

In overview, a method in accordance with the disclosure comprises securing media generated by a media device with a media key and protecting the media key with a domain key to form an encrypted media token. When a receiving entity wishes to access the media, a trusted service provider can authenticate the receiving entity and decrypt encrypted media token to retrieve the media key for use by the receiving entity to decrypt the media. In this way, the media can be protected by the media device which generates it without being subsequently decrypted until it is present at an authorised receiving entity. Intermediate entities are not required to have access to the decrypted media. The disclosure further provides a computer readable medium and a system configured to carry out this method.

In some aspects of the disclosure a method for securing media content in a network comprising the following steps is provided: A media device receives a domain key from a service provider. The media device further encrypts media with a media key and encrypts the media key with the domain key to form an encrypted media token: the protected media key is encapsulated in an encrypted media token. The service provider may then receive the encrypted media token and one or more receiving entity identifiers relating to a receiving entity and ascertain whether the receiving entity is entitled to access media from the media device. If the receiving entity is entitled to access media from the media device, the service provider decrypts the cryptographic media token using the domain key to obtain the media key and providing the media key to the receiving entity. As such, an authenticated receiving entity may obtain the media key necessary to decrypt the media. Moreover, there is no requirement for any intermediate entity to have similar access and thus the encryption provided by the media key is in place throughout the transport of the media from media device to receiving entity.

In some embodiments, the media key is generated at the media device. Alternatively, the media key may be received by the media device from an external source, such as the service provider. The media key may be, for example, randomly generated.

Optionally, the domain key is associated with a domain defining one or more media devices within the network. Thus, the domain key may be common to more than one media device. A given media device may be added to or removed from a domain over time, allowing control over access to media from that media device through the process of authenticating a receiving entity. The receiving entity may be authenticated before the step of ascertaining whether the receiving entity is authorised to access media from media devices within the domain associated with the domain key.

The media device may receive the domain key from the service provider in a form encrypted using one or more media device identifiers. In this manner, the service provider may ensure security of the transmission of the domain key to the media device.

The encrypted media token may comprise metadata associated with the domain key. The protected media key is in that case encapsulated in the encrypted media token with metadata. For example, this metadata may identify the domain with which the domain key is associated or may in some other way allow the domain key to be identified. This can assist the service provider in locating the domain key to be used to decrypt the encrypted media token.

In some embodiments, the media device transmits the encrypted media token to the receiving entity and the service provider receives the encrypted media token from the receiving entity. For example, the encrypted media token may be transmitted to the receiving entity together with the media itself. In other examples, the encrypted media token may be transmitted to the receiving entity in an out-of-band communication, e.g. separately to the media. The encrypted media token may be transmitted directly from the media device to the receiving entity or may be transmitted via one or more intermediate entities.

The service provider may receive the encrypted media token in a form encrypted using one or more receiving device identifiers. Alternatively or additionally, the service provider may provide the media key to the receiving entity in a form encrypted using one or more receiving device identifiers. This approach can help to secure communication between the receiving entity and the service provider.

One or both of the media key and domain key may be changed periodically. In this manner, security can be increased. Changing the media key or the domain key may cause regeneration of the encrypted media token. For example, the media stream may comprise data packets and each data packet may be encrypted using the media key prior to transmission from the media device. If the media key is changed, e.g. after a pre-determined length time or after a pre-determined number of packets, then subsequent packets of the same media stream are encrypted using the updated media key.

The media may comprise audio and/or visual content. The visual content may comprise video or one or more still images. The media may further comprise metadata. Such metadata could include, for example, an alarm indication designed to alert a user. The media may be streaming media. The media may be generated in real time by the media device. The media device may comprise a camera. For example, the media device may be a surveillance camera such as a mobile surveillance camera. The media device may be a drone, robot or wearable camera, for example. The media device may be, but is not limited to, any other device capable of processing or generating media.

In some aspects of the disclosure, there is provided a computer readable medium comprising computer executable instructions for carrying out the method of the aspects described above. Moreover, further aspects of the disclosure provide a system configured to carry out these methods.

In some aspects of the disclosure there is provided a system for securing media content in a network comprising a media device and a service provider. The media device is configured to: receive a domain key from the service provider; and encrypt media with a media key and encrypting the media key with the domain key to form an encrypted media token. The service provider is configured to receive the encrypted media token and one or more receiving entity identifiers relating to a receiving entity; ascertain whether the receiving entity is entitled to access media from the media device; and, if the receiving entity is entitled to access media from the media device, decrypt the encrypted media token using the domain key to obtain the media key and provide the media key to the receiving entity. Optional features of the method may also apply to the system. The system may further comprise the receiving entity. The receiving entity may be configured to decrypt the media using the media key received from the service provider.

Some specific embodiments are now described by way of illustration with reference to the accompanying drawings.

With reference to FIG. 1, a system is illustrated which comprises a camera device 11, one or more intermediate devices 20 and a receiving entity 30. The camera device is a media device which can generate media to be received by the receiving entity 30. The media generated by the camera 11 may be transmitted to the receiving entity 30 via the one or more intermediate entities 20.

The camera device 11 may be part of any fixed or mobile surveillance system, such as a drone, robot or wearable device. In general it may be any device capable of processing or generating media content. The intermediate entities 20 may be any network element capable of passing on network traffic, while the receiving entity 30 could be any suitable device for playback or processing of media. The receiving entity 30 may be located at a surveillance control room or any other desired location, and may be fixed or portable. The receiving entity 30 may, for example, be a network-enabled end-user device such as a laptop, personal computer, tablet computer, smartphone or similar.

Also shown as part of the system of FIG. 1 is a license provisioning service 40. This acts as a service provider and may communicate with a policy manager 50. There is also shown a secrets provision service 60, which may optionally be provided to communicate with camera device 11 and receiving entity 30.

The license provision service 40, policy manager 50 and secrets provision service 60 may act in concert as a service provider. Each of them may be implemented as a cloud-based service or may be implemented on defined physical devices, such as a server.

In general, each of the elements illustrated in FIG. 1 may be implemented on one or more computing devices, further details of which are set out below with reference to FIG. 4.

Figure 2:
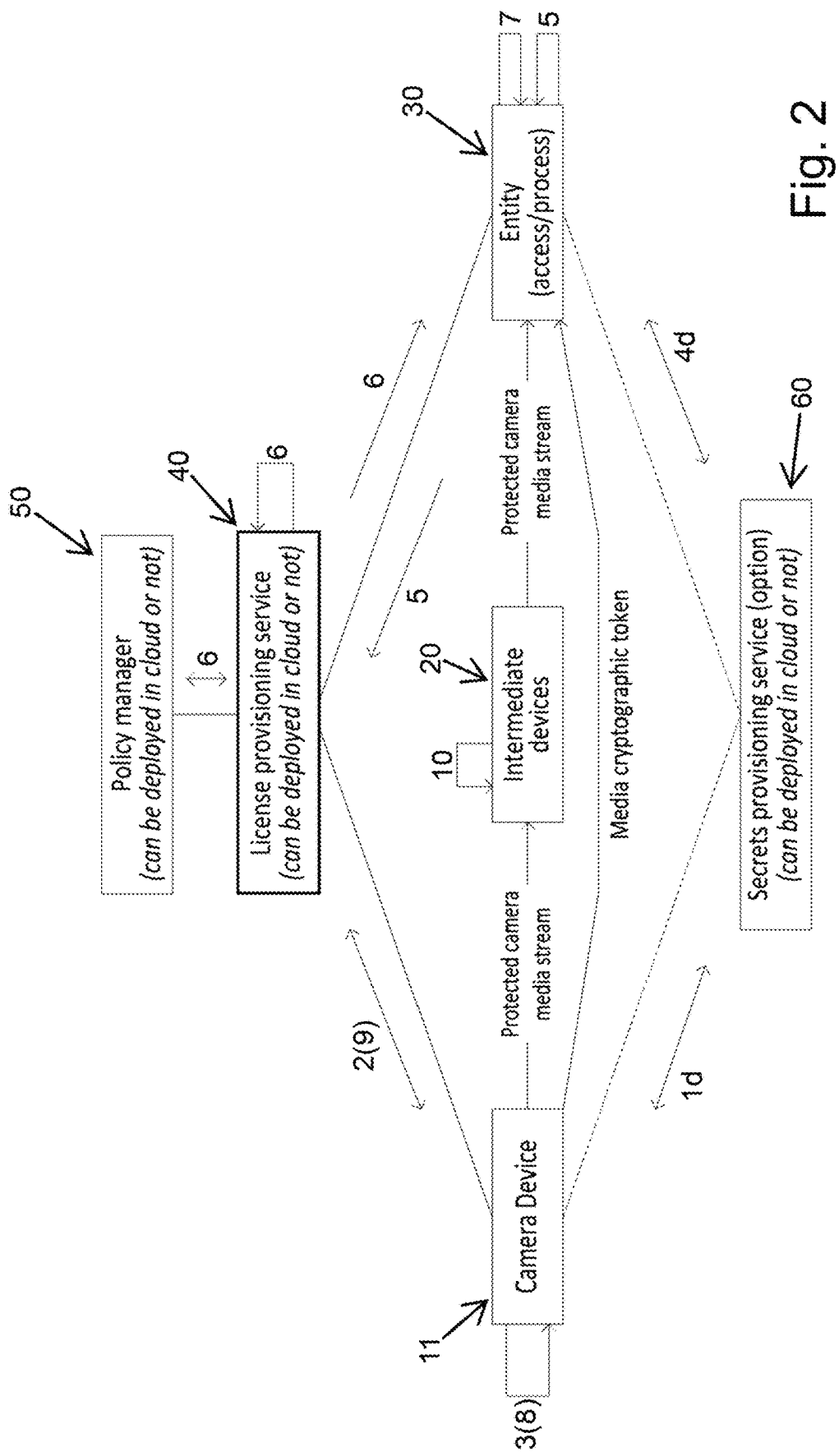
FIG. 2 is the schematic illustration of FIG. 1 with additional information representing processing steps at each entity.
Figure 3:
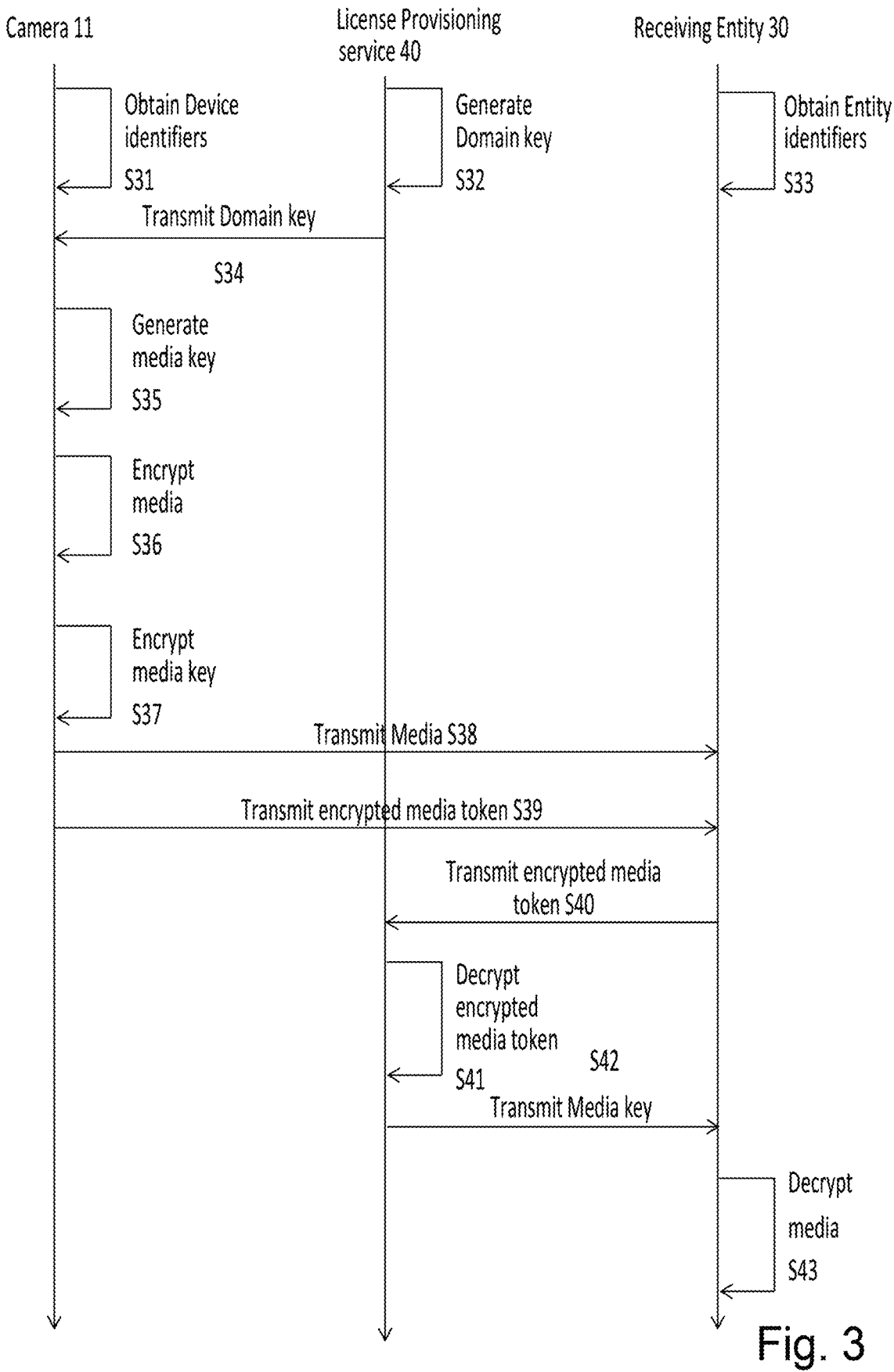
FIG. 3 is a process diagram showing the process of a preferred embodiment.

The operation of the system of FIG. 1 can be understood with reference to FIGS. 2 and 3. FIG. 2 shows the system of FIG. 1 with additional reference numerals identifying communication within or between system elements associated with process steps described below. This numbering in FIG. 2 is associated with paragraph numbers "1" to "10" below. FIG. 3 is a process diagram providing further exposition of the certain process steps and illustrating these in one possible sequential order.

1—At step s31, the camera 11 is configured with device unique secrets. There are one or more identifiers associated with the camera 11. Those secrets can be software or hardware based. They can be pre-provisioned at manufacturing time or over-the-air as shown as in FIG. 2, option 1d from the secret provisioning service 60.

2—The camera is associated with a domain. This domain may connect or associate the camera with the area it covers. At step s32, a domain key may be generated for the domain by the license provisioning service 40. At step s34, which may occur during installation of camera 11, the unique domain key is supplied over-the-air from the license provisioning service 40. This domain key is securely protected when transmitted to the camera 11 using available device unique secrets. When the camera is installed in a new area or the existing area is split into new domain, a new unique domain key is supplied to the camera.

3—The camera 11 may generate a media key at step s35 used to encrypt media generated by the camera at step s36. At step s37, this media key is protected using the unique domain key and an encrypted media token is generated. The encrypted media token comprises the protected media key and additional metadata. Any relevant information may be recorded in the metadata, such as information identifying the domain associated with camera 11. Since the media is encrypted within the camera 11, it is protected as it leaves the camera 11 to be transmitted elsewhere. For example, at step s38, the media encrypted by the media key is transmitted to the receiving entity 30. As can be seen in FIG. 2, this transmission may occur via one or more intermediate entities 20. At step s29, the encrypted media token is also transmitted to the receiving entity 30. Depending on the streaming format, the encrypted media token can be transmitted either embedded in the protected camera media content or with an out-of-band channel.

4—The receiving entity 30 may be configured with entity unique secrets at step s33. These act as one or more identifiers associated with the receiving entity. The secrets can be software or hardware based. They can be pre-provisioned at manufacturing time or over the air as illustrated in FIG. 1, option 4d from the secret provisioning service 60.

5—Following step s39 described above, the receiving entity has received the encrypted media token from the camera 11. If necessary, it may extract this token from the media stream. In some alternatives, it will obtain it from an out-of-band channel. The receiving entity 30 then provides the encrypted media token to the license provisioning service 40 at step s40. This is provided in the form of a cryptographic challenge secured with entity unique secrets. This cryptographic challenge is used to authenticate the receiving entity 30.

6—The license provisioning service 40 verifies the cryptographic challenge which authenticated the receiving entity 30 in the previous step 5, and extracts the encrypted media token. The license provisioning service 40 identifies the domain from the metadata encapsulated in the encrypted media token. It may then confirm whether the receiving entity is authorised to access media from the camera 11. If receiving entity 30 is authorized to access this domain by the policy manager 50, the license provisioning service 40 extracts the media key from the encrypted media token using the domain key at step s41. The license provisioning service 40 then generates an encrypted entity token encapsulating the media key with relevant usage rules. The encrypted entity token is protected using the entity unique secrets known to the receiving entity 30, rather than the domain key not known to the receiving entity 30, and is provided back to the receiving entity 30 at step s42.

7—The receiving entity 30 then verifies the encrypted entity token received from the license provisioning service 40. The receiving entity 30 may then extract the media key and can therefore decrypt the protected camera media content according to the related usage rules at step s43. The resulting unprotected camera media content can be accessed and/or processed by the receiving entity.

8—As an option and in order to improve protection of camera media content, the media key can be changed periodically. For example, the media stream may comprise data packets and each data packet is encrypted using the media key prior to transmission from the camera 11. If the media key is changed, e.g. after a pre-determined length time or after a pre-determined number of packets, then subsequent packets of the same media stream are encrypted using the updated media key. In that case the encrypted media token must be regenerated for each media key change and transmitted again to the receiving entity 30. This approach can help to secure communication between a receiving entity and the service provider, even if the receiving entity is initially authorised to decrypt a media stream, by requiring re-authentication of the receiving entity using the regenerated encrypted media token.

9—Similarly and for same reason, the domain key can be changed periodically. In that case a new media key and a new encrypted media token must be generated for each domain key change and transmitted again to the receiving entity 30.

10—As the proposed camera media content protection scheme preserves the properties of the content format, any intermediate entity which is not authorized to access the unprotected camera media content can still record the protected camera media content with no privacy issue. This recorded camera media content can be duplicated anywhere with no privacy issue; It remains protected and accessing it requires authenticating the entity that needs to access or process the camera media content and verifications by the license provisioning service 40 as described in 5, 6 and 7.

The process can uniquely protect content from the camera 11 or other media device and affords protection of the media regardless of the number of devices such as intermediate devices 20 involved in a processing chain.

Figure 4:
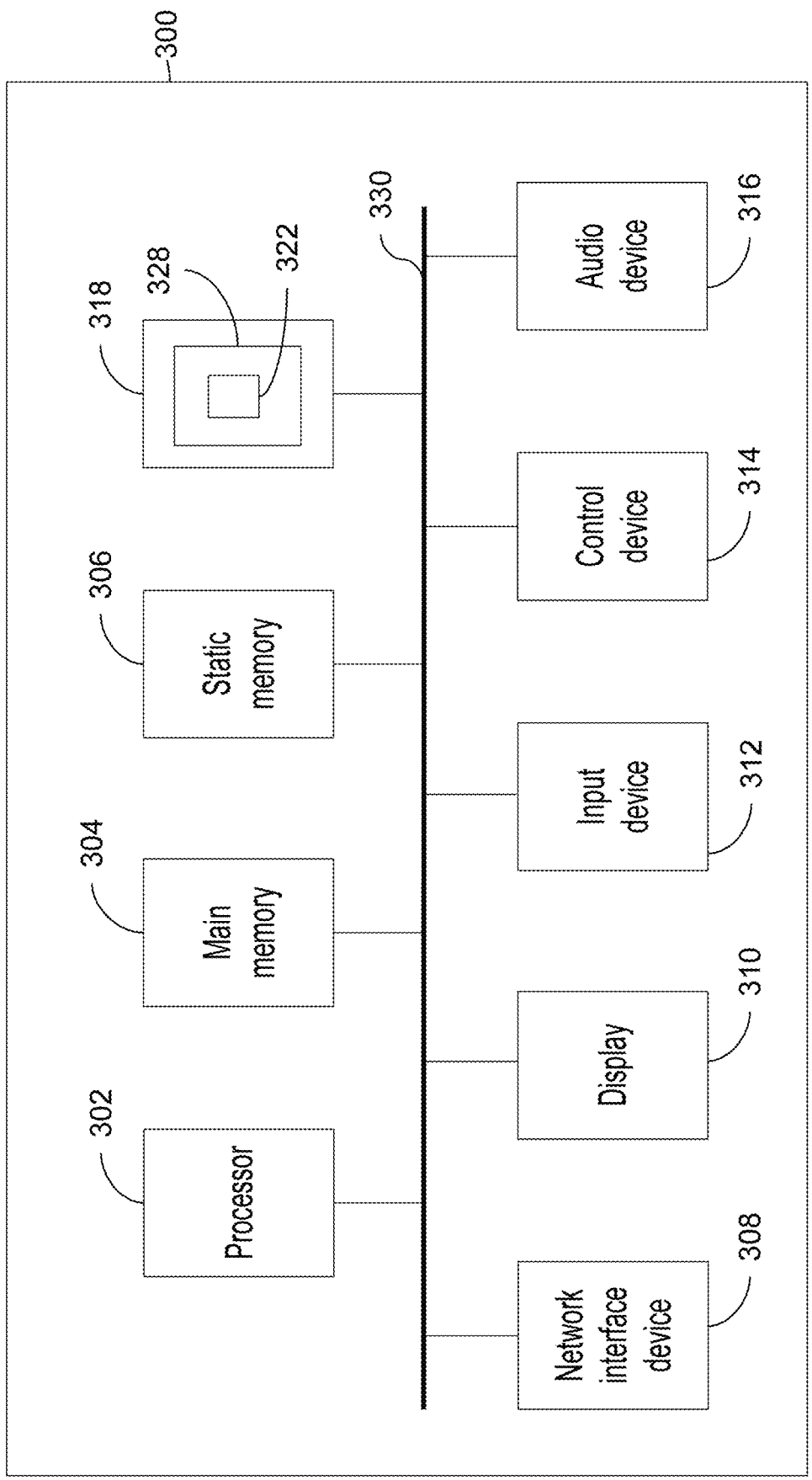
FIG. 4 shows a hardware infrastructure for implementing a preferred embodiment.

FIG. 4 illustrates a block diagram of one implementation of a computing device 300 within which a set of instructions, for causing the computing device to perform any one or more of the methodologies discussed herein, may be executed. The computing device 300 may be used for elements of the system shown in FIGS. 1 and 2. In alternative implementations, the computing device may be connected (e.g., networked) to other machines in a Local Area Network (LAN), an intranet, an extranet, or the Internet. The computing device may operate in the capacity of a server or a client machine in a client-server network environment, or as a peer machine in a peer-to-peer (or distributed) network environment. The computing device may be a personal computer (PC), a tablet computer, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single computing device is illustrated, the term "computing device" shall also be taken to include any collection of machines (e.g., computers) that individually or jointly execute a set (or multiple sets) of instructions to perform any one or more of the methodologies discussed herein.

The example computing device 300 includes a processing device 302, a main memory 304 (e.g., read-only memory (ROM), flash memory, dynamic random access memory (DRAM) such as synchronous DRAM (SDRAM) or Rambus DRAM (RDRAM), etc.), a static memory 306 (e.g., flash memory, static random access memory (SRAM), etc.), and a secondary memory (e.g., a data storage device 318), which communicate with each other via a bus 330.

Processing device 302 represents one or more general-purpose processors such as a microprocessor, central processing unit, or the like. More particularly, the processing device 302 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processing device 302 may also be one or more special-purpose processing devices such as an application specific integrated circuit (ASIC), a field programmable gate array (FPGA), a digital signal processor (DSP), network processor, or the like. Processing device 302 is configured to execute the processing logic (instructions 322) for performing the operations and steps discussed herein.

The computing device 300 may further include a network interface device 308. The computing device 300 also may include a video display unit 310 (e.g., a liquid crystal display (LCD) or a cathode ray tube (CRT)), an alphanumeric input device 312 (e.g., a keyboard or touchscreen), a cursor control device 314 (e.g., a mouse or touchscreen), and an audio device 316 (e.g., a speaker).

The data storage device 318 may include one or more machine-readable storage media (or more specifically one or more non-transitory computer-readable storage media) 328 on which is stored one or more sets of instructions 322 embodying any one or more of the methodologies or functions described herein. The instructions 322 may also reside, completely or at least partially, within the main memory 304 and/or within the processing device 302 during execution thereof by the computing device 300, the main memory 304 and the processing device 302 also constituting computer-readable storage media.

The various methods described above may be implemented by a computer program. The computer program may include computer code arranged to instruct a computer to perform the functions of one or more of the various methods described above. The computer program and/or the code for performing such methods may be provided to an apparatus, such as a computer, on one or more computer readable media or, more generally, a computer program product. The computer readable media may be transitory or non-transitory. The one or more computer readable media could be, for example, an electronic, magnetic, optical, electromagnetic, infrared, or semiconductor system, or a propagation medium for data transmission, for example for downloading the code over the Internet. Alternatively, the one or more computer readable media could take the form of one or more physical computer readable media such as semiconductor or solid state memory, magnetic tape, a removable computer diskette, a random access memory (RAM), a read-only memory (ROM), a rigid magnetic disc, and an optical disk, such as a CD-ROM, CD-R/W or DVD.

In an implementation, the modules, components and other features described herein (for example control unit 310 in relation to FIG. 4) can be implemented as discrete components or integrated in the functionality of hardware components such as ASICS, FPGAs, DSPs or similar devices as part of an individualization server.

A "hardware component" is a tangible (e.g., non-transitory) physical component (e.g., a set of one or more processors) capable of performing certain operations and may be configured or arranged in a certain physical manner. A hardware component may include dedicated circuitry or logic that is permanently configured to perform certain operations. A hardware component may be or include a special-purpose processor, such as a field programmable gate array (FPGA) or an ASIC. A hardware component may also include programmable logic or circuitry that is temporarily configured by software to perform certain operations.

Accordingly, the phrase "hardware component" should be understood to encompass a tangible entity that may be physically constructed, permanently configured (e.g., hardwired), or temporarily configured (e.g., programmed) to operate in a certain manner or to perform certain operations described herein.

In addition, the modules and components can be implemented as firmware or functional circuitry within hardware devices. Further, the modules and components can be implemented in any combination of hardware devices and software components, or only in software (e.g., code stored or otherwise embodied in a machine-readable medium or in a transmission medium).

Unless specifically stated otherwise, as apparent from the following discussion, it is appreciated that throughout the description, discussions utilizing terms such as "receiving", "determining", "comparing", "enabling", "maintaining," "identifying," "replacing," or the like, refer to the actions and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

It is to be understood that the above description is intended to be illustrative, and not restrictive. Many other implementations will be apparent to those of skill in the art upon reading and understanding the above description. Although the present disclosure has been described with reference to specific example implementations, it will be recognized that the disclosure is not limited to the implementations described, but can be practiced with modification and alteration within the spirit and scope of the appended claims. Accordingly, the specification and drawings are to be regarded in an illustrative sense rather than a restrictive sense. The scope of the disclosure should, therefore, be determined with reference to the appended claims, along with the full scope of equivalents to which such claims are entitled.

The invention claimed is:

1. A method for securing media content in a network, the method comprising:
   at a service provider that is configured to provide security for media content communicated from a media device to a receiving entity:
   generating a domain key;
   providing the domain key to the media device, wherein the media device is configured to generate audio and/or visual media;
   receiving an encrypted media token and a receiving entity identifier from a receiving entity, wherein the encrypted media token comprises a media key, generated by the media device, encrypted using the domain key; and
   responsive to determining that the receiving entity is entitled to access media from the media device:
   decrypting the encrypted media token using the domain key to obtain the media key; and
   providing the media key to the receiving entity.

2. The method of claim 1, wherein providing the media key to the receiving entity comprises:
   encrypting media token using an entity secret known to the receiving entity to generate a reencrypted media token; and
   transmitting the reencrypted media token to the receiving entity.

3. The method of claim 1, further comprising:
   at the service provider:
   receiving an encrypted updated media token from the receiving entity;
   responsive to determining that the receiving entity is entitled to access media from the media device:
   decrypting the encrypted updated media token using the domain key to obtain an updated media key; and
   providing the updated media key to the receiving entity.

4. The method of claim 1, further comprising:
   updating the domain key to generate an updated domain key; and
   providing the updated domain key to the media device.

5. The method of claim 1, wherein the domain key is associated with a domain defining one or more media devices within the network.

6. The method of claim 5, further comprising establishing that the receiving entity is authorized at access media from the one or more media devices of the domain.

7. The method of claim 5, wherein providing the domain key to the media device comprises encrypting the domain key using a media device identifier to generate an encrypted domain key and providing the encrypted domain key to the media device.

8. The method of claim 1, wherein receiving the encrypted media token comprises receiving the encrypted media token as a cryptographic challenge secured with an entity secret, and further comprising verifying the cryptographic challenge.

9. The method of claim 1, wherein the media device comprises a camera.

* * * * *